Figure 1:
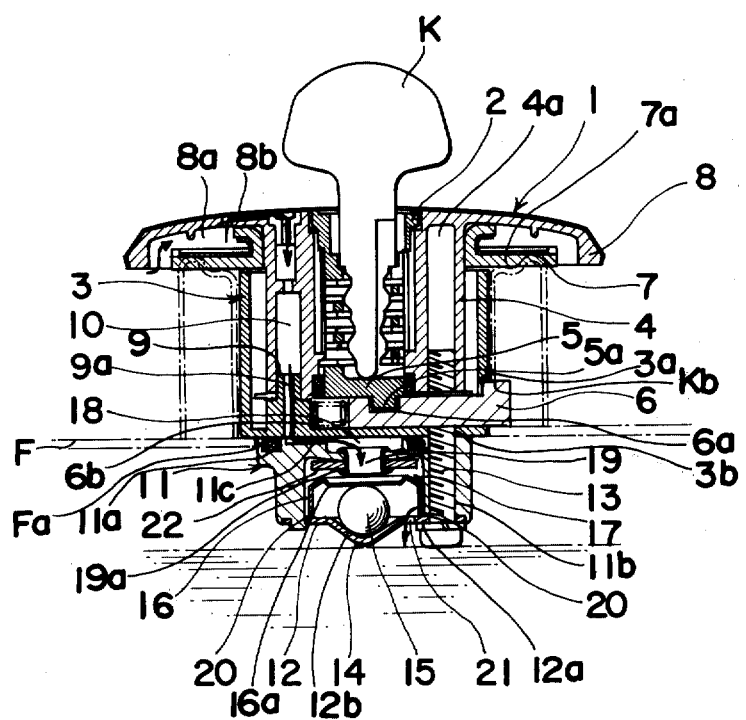

United States Patent

Hukuta

[11] 4,053,083
[45] Oct. 11, 1977

[54] MOTOR VEHICLE FUEL TANK CAP

[75] Inventor: Masakazu Hukuta, Tsushima, Japan

[73] Assignee: Kabushiki Kaisha Tokai Rika Denki Seisakusho, Japan

[21] Appl. No.: 729,239

[22] Filed: Oct. 4, 1976

[51] Int. Cl.² .......................................... B65D 51/16
[52] U.S. Cl. .................................. 220/202; 220/303
[58] Field of Search ............... 220/202, 210, 303, 205, 220/293, 360, 367, 373; 137/43, 519, 519.5, 493, 513.5, 532, 533.11, 533.13, 533.15, 533.17

[56] References Cited

U.S. PATENT DOCUMENTS

| 3,757,987 | 9/1973 | Marshall | 220/303 X |
| 3,907,155 | 9/1975 | Smith et al. | 220/303 X |
| 3,970,098 | 7/1976 | Boswank et al. | 137/43 X |
| 3,985,260 | 10/1976 | Evans | 220/303 X |

Primary Examiner—William Price
Assistant Examiner—Steven M. Pollard
Attorney, Agent, or Firm—Sughrue, Rothwell, Mion, Zinn and Macpeak

[57] ABSTRACT

Motor vehicle fuel tank cap of the air bleeder type which includes passages permitting external air to enter a fuel tank and so maintain air pressure in the tank at a level permitting correct feed of fuel to the motor vehicle engine and which includes an attitude-sensor valve unit which when the motor vehicle becomes inclined more than a certain amount with respect to the vertical closes the air passages, whereby leakage of fuel to the exterior of the fuel tank is prevented and risk of accident is avoided.

4 Claims, 3 Drawing Figures

MOTOR VEHICLE FUEL TANK CAP

The present invention relates to an improved cap for the fuel tank of a motor vehicle. More particularly the invention relates to a fuel tank cap which is especially suited to use in a motor bicycle and prevents leakage of fuel from a fuel tank.

In a motor cycle to whose engine fuel is supplied by gravity feed from a fuel tank, if the fuel tank is completely sealed to outside air, as the level of fuel in the fuel tank becomes lower the air initially enclosed in the fuel tank above the fuel must occupy an increasingly greater space, with the result that pressure thereof falls, and there may be failure for air to be correctly supplied to the motor bicycle engine. To avoid such an occurrence it is known to fit the fuel tank of a motor bicycle with a so-called air-bleed type cap, i.e., a cap wherein there is defined a passage or passages permitting external air to pass therethrough and enter the fuel tank, whereby air pressure inside the fuel tank is maintained at or close to atmospheric pressure and correct fuel supply is ensured.

However, with this type of fuel tank cap if the motor bicycle is inclined more than a certain amount from a vertical attitude, there is liable to be leakage of fuel via the cap passage or passages for permitting in-flow of air, particularly if the fuel tank is almost full. Even when the fuel tank is close to empty, if the motor bicycle is suddenly overturned when travelling at speed there is almost certainly liable to be leakage of fuel, since the fuel is thrown with considerable force against the fuel tank cap. In this latter case, there is obviously also the risk of fire or explosion, since fuel which has leaked may easily come into contact with very hot portions of the motor bicycle engine.

It is accordingly a principal object of the present invention to provide an improved motor vehicle fuel tank cap which permits gradual entry of air into a fuel tank, thereby ensuring correct feed of fuel from the fuel tank to the motor vehicle engine, but which also ensures safety by preventing leakage of fuel via the fuel tank cap if the motor vehicle is overturned or becomes inclined more than a certain amount from a vertical attitude.

It is another object of the invention to provide a motor vehicle fuel tank cap which while ensuring correct feed of fuel and avoiding risk of undesired fuel leakage has a compact and simple construction.

In accomplishing these and other objects, there is provided according to the present invention a motor vehicle fuel tank cap wherein there are defined air passages providing communication between the external atmosphere and the interior of the fuel tank, and an attitude sensor means which is located on one of these air passages and which when the motor vehicle, and hence the fuel tank and fuel tank cap provided therein, are in a normal, upright attitude permits free passage of external air into the fuel tank, but which when the motor vertical is inclined more than a certain amount, suitably ±5°, from the normal upright attitude thereof, seals the passage, whereby leakage of fuel, either gradual or rapid, is prevented. Upon return of the motor vehicle to a normal attitude, the attitude sensor means automatically re-opens the passage, so permitting continued entry of external air into the fuel tank.

Figure 2:
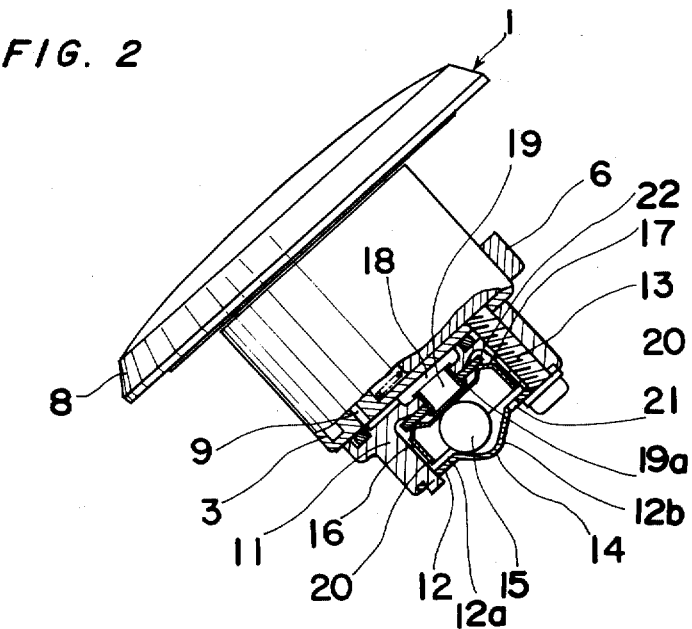
Figure 3:
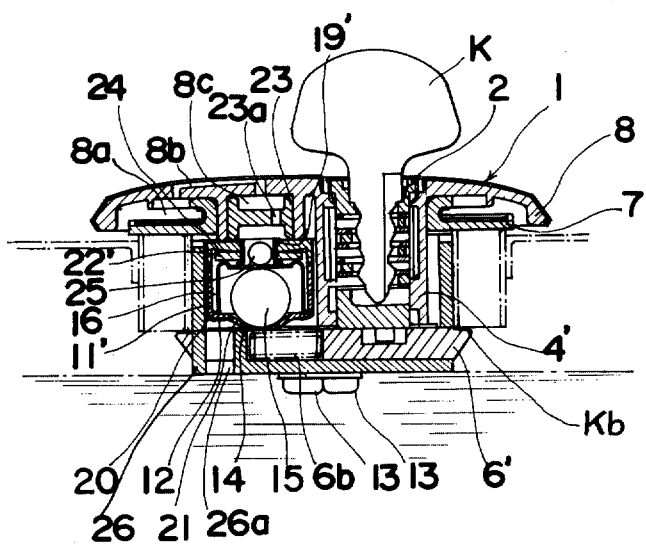

A better understanding of the present invention may be had from the following full description of several preferred embodiments thereof when read in reference to the attached drawings, in which like numbers refer to like parts, and FIG. 1 is a vertical cross-sectional view of a fuel tank cap according to a first embodiment of the invention;

FIG. 2 is a cross-sectional view showing the disposition adopted by elements of the fuel tank cap of FIG. 1 to seal an air passage when a motor vehicle is inclined more than a certain amount from a normal upright attitude; and FIG. 3 is a vertical cross-sectional view of a fuel tank cap according to another embodiment of the invention.

Referring to FIG. 1, there is shown a fuel tank cap according to a first embodiment of the invention which comprises a main body portion 1, a cap case 3 which fits onto and around the lower portion of the main body portion 1, and an attitude-sensor valve unit 11 which is fitted onto the lower surface of the cap case 3, and which, when the cap is fitted onto a fuel tank is the lowermost portion of the cap.

The main body portion 1 comprises an outer cover portion 8 which in plane view is circular and in vertical cross section is domed, and a cylindrical stem portion 4 which has a diameter considerably smaller than that of the outer cover portion 8 and also smaller than that of a fuel tank inlet indicated by the chain-dot line portion of the drawing, and is integrally or fixedly attached to, and extends vertically downwards from the central portion of the lower surface of the outer cover portion 8. Around the topmost portion of the stem portion 4 there is provided a circular packing element 7. The main portion 7a of the packing element 7 extends radially outward from the stem portion 4, and extends over a circular area having a diameter greater than that of the fuel tank inlet, whereby the packing element main portion 7a may seal the upper opening of the fuel tank inlet when the cap is fitted on the fuel tank inlet. The packing element main portion 7a does not, however, extend to as far as the outer edge wall portion of the cover portion 8. The inner end portion of the packing element 7 is bent upwards and back and is pressed against the lower surface of the outer cover portion 8 and the uppermost outer wall portion of the stem portion 4, there thus being defined a clearance 8a between the lower surface of the cover portion 8 and the outer edge and upper surface of the packing element main portion 7a.

The clearance 8a communicates with an air passage 8b which is defined in and is generally parallel to the upper surface of the cover portion 8, and leads to a series of vertically aligned, communicating air passages 10 defined in one side of the stem portion 4, the lowermost passage 10 defining an opening at the lower surface of the stem portion 4. The air passage 10 may of course be defined as a single passage, but in order to deter entry of particles of dust, etc., there is preferably provided a plurality of passages 10, which may be cut of vertical alignment with one another and connected by short horizontal passages, for example.

In the opposite side of the stem portion 4 there is defined a vertically aligned mounting hole 4a, which extends to the lower surface of the stem portion 4 and the lower end portion of which is internally threaded.

In the central portion of the main body portion 1 there is provided a lock 2 into which a cap key K may be inserted and elements of which, when actuated by turning action of the cap key, may cause a lowermost slide cam element 5 to move left or right as seen in the drawing. The cam element 5 defines a downwardly extending actuator projection 5a which is engaged in a concave portion 6a defined in the upper surface of a lock bolt 6, described below.

Externally the cap case 3 has the form of a cylinder which has a diameter close to that of the fuel tank inlet whereby the cap case 3 may enclose the stem portion 4 of the main body portion 1 and may fit smoothly in the fuel tank inlet. The bottom wall of the case 3 defines an internally threaded opening 3a, which is in line with and equal in diameter to the mounting hole 4a defined in the main body portion stem portion 4, and an upward projection portion 9 comprising a shoulder portion which may fit, either directly a through suitable packing elements, against the lower surface of that portion of the stem portion 4 in which the lowermost air passage 10 is defined, and a neck portion which extends into and fits exactly in the lower end portion of the lowermost air passage 10. In the projection portion 9 there is defined a vertically aligned an air passage 9a, which extends completely through the projection 9, and thus provides communication between the air passages 10 and the exterior of the bottom wall of the cap case 3.

The outer surface of the bottom wall of the cap case 3 is flat and in the mounted position of the cap the peripheral portions of the cap case bottom wall contact horizontal wall portions provided at the lower end of the fuel tank inlet F and defining an opening Fa which is smaller in diameter than the main portion of the fuel tank inlet and generally equal in diameter that the upper portion of the attitude-sensor valve unit 11 attached to the bottom wall of the cap case 3. In this position, the side wall portion of the cap case 3 extends upwards to as far as or to close to the lower surface of the packing element 7.

The abovementioned lock bolt 6 is provided in a generally horizontal alignment in the lower portion of the cap case 3 and is in line with an opening 3a which is defined in the side-wall portion of the cap case 3 and permits sliding movement of the lock bolt 6 therethrough, and with an lock hole Kb defined in the sidewall portion of the fuel tank inlet and in which, when the lock bar 6 is in an outwardly extended position, an outer end portion of the lock bolt 6 may be engaged, so locking the fuel tank cap in position in the fuel tank inlet. The lock bolt 6 is normally maintained in an outwardly extended position by an expansion spring element 6b, which is confined between and presses against the inner end of the lock bar 6 and an outer wall portion of the upward projection portion 9 defined by the bottom wall of the cap case 3. By turning action of the lock key the force exerted by the spring 6b may be overcome and the abovementioned slide cam element 5 caused to move leftwards as seen in the drawing, whereupon the actuator projection 5a of the cam element 5 presses against the side wall portion of the concave portion 6a defined in the upper surface of the lock bolt 6 and the lock bolt 6 is moved out of engagement with the lock hole defined in the sidewall of the fuel tank inlet, so permitting withdrawal of the cap from the fuel tank inlet. The lock portion 2 of the cap is suitably so constructed that the cap key may not be withdrawn therefrom unless the lock bolt 6 is in an outwardly extended, i.e., locking position.

Still referring to FIG. 1, and also referring to FIG. 2, the attitude-sensor valve unit 11 comprises a main housing wall, the upper surface portion of which fits against the lower surface of the bottom wall of the cap case 3 and has provided in a grooved portion thereof suitable sealing ring means 11a, and in one side of which there is defined a vertically aligned, internally threaded hole 11b which extends completely through the side wall and has a diameter equal to that of the mouting hole 4a in the main body portion stem portion 4 and corresponding hole defined in the bottom wall of the cap case 3, the main body portion 1, cap case 3 and valve unit 11 being held together by a threaded bolt 13 which is screwed into these holes.

Integrally attached to and extending inwardly from the inner surface of an upper end portion of the main housing wall of the valve unit 11 there is a generally horizontal support wall portion 11c defining a central opening into which is exactly fitted a fixed, vertically aligned hollow pipe element 19 the upper opening of which is generally level with the upper surface of the support wall 11c, which extends to some distance below the lower surface of the support wall portion 11c and the lower opening of which defines a flanged portion 19a. Around the portion of the pipe element 19 which extends below the support wall portion 1c there is provided a circular sheet 22 which is made of rubber or similar material and is held between the support wall portion 11c and the flanged portion 19a of the pipe element 19.

Between a portion of the support wall portion 11a and the lower surface of the cap case 3 there is defined a clearance 18 via which air may pass from the air passage 9 defined in the bottom wall upward projection 9a of the cap case 3 to the pipe element 19.

The bottom wall 12 of the valve unit 11 is normally fixedly attached to the main housing, but is preferably detachable, in order to facilitate assembly of the valve unit 11 and defines a curved, downwardly concave central portion 14, the peripheral portion 12a of the bottom wall 12 being generally level with the lower end surface of the main housing wall of the valve unit 11 and the concave central portion 14 extending to below this level. In the peripheral portion 12a of the bottom wall 12 there is defined at least one opening 21 which provides communication between the interior of the valve unit 11 and the air-space above the fuel in the fuel tank.

Normally, when the fuel tank and fuel tank cap are disposed vertically, a spherical weight ball 15, which has a diameter somewhat greater than that of the central hollow 12b and also greater than the distance between the bottom wall peripheral portion 12a and the lower end of the pipe element 19 and is made of steel or other material having a specific gravity which is large compared with that of fuel in the fuel tank, is seated in the central concave portion 14. Around the upper portion of the weight ball 15 there is provided a mantle element 16, which fits loosely in the lower portion of the valve unit 11. The top wall portion of the mantle element 16 defines an upwardly extending peripheral portion 17, and a lower central portion 16a the lower surface of which normally rests on the top of the weight ball 15. The straight-line distance between the upper edge of the upwardly extending peripheral portion 17 and the upper surface of the central portion 16a is greater than the thickness of the flanged portion 19a of the pipe element 19, i.e., greater than the distance between the lower end opening of the pipe element 19 and the lower surface of the circular rubber sheet 22. In this normal position of the mantle element 16, the upwardly extending peripheral portion 17 of the top wall portion thereof is slightly below the level of the lower end opening of the pipe element 19, the side-wall portion thereof is close to the main housing of the valve unit 11, the lower end of the side-wall portion thereof rests on the peripheral portion 12a of the valve unit bottom wall 12 and the mantle element 16 encloses that portion of the bottom wall peripheral portion 12a in which the abovementioned opening 21 is defined. In a side wall portion of the mantle element 16 there is defined at least one air-passage opening 20. Preferably there are provided two or more openings 20, which are located at points which are disposed symmetrically with respect to the central point of the space enclosed by the mantle element 16.

In the normal position of the fuel tank cap, as indicated by the arrows in FIG. 1, external air may pass through the clearance 8a and passage 8b defined in the top cover portion 8 of the main body portion 1, through the passages 10 defined in the stem portion 4, through the passage 9 defined in the cap 3, through the clearance 18 defined between the cap case 3 and attitudesensor valve unit 11, through the pipe element 19 into the space above the mantle element 16, around the outside of the mantle element 16, through the opening 20 defined in the side-wall portion of the mantle element 16, through the interior of the mantle element 16, and then through the opening 21 into the fuel tank interior, whereby air pressure above the fuel in the fuel tank is maintained generally equal to atmospheric pressure, and feed of fuel to the engine may be correctly effected.

If, however, the cap becomes inclined with respect to the vertical, as shown in FIG. 2, the weight ball 15 rolls along a side portion of the curved concave central portion 14 of the bottom wall 12 of the valve unit 11, towards the bottom wall peripheral portion 12a, and simultaneously pushes the mantle element 16 towards the lower end of the pipe element 19. As the various elements of the valve unit 11 have the abovedescribed dimensions, before reaching the bottom wall peripheral portion 12a, the weight ball 15 pushes the mantle element 16 into a position wherein the upwardly extending peripheral portion 17 of the top wall of the mantle element 16 presses against the rubber sheet 22, whereby even though fuel may pass through the opening 21 into the lower portion of the valve unit 11, passage of fuel through the pipe element 19 and thence to the exterior of the fuel tank cap is effectively prevented.

In tests conducted with a motor bicycle having a fuel tank fitted with a fuel tank cap according to the invention, it was found that even when the fuel tank is full there is no leakage of fuel when the motor bicycle is tilted either left or right to an inclination of 15° with respect to the vertical. There is similarly no leakage of fuel when the motor bicycle, with a full fuel tank was subjected to rapid start and sharp braking conditions, as was shown by a test in which the motor bicycle was subjected 10 times to an accelerating force of 0.8 G which was maintained each time for 2 seconds, and 10 times to a decelerating force of −0.8 G for 2 seconds. Further, when the fuel tank is full and the motor bicycle is laid down, so inclining the fuel tank cap to an angle of 90° with respect to the vertical leakage of fuel via the cap is less than 5 cc per minute. In other words, leakage of fuel is prevented during normal driving conditions and even if the motor bicycle is overturned while parts of the engine thereof are at a temperature which is above the flash point of the fuel, the flow rate of fuel via the fuel tank cap is far below that which is liable to result in a conflagration, and the invention thus makes a considerable contribution to improvement of safety in motor vehicles.

Reference is now had to FIG. 3 showing a fuel tank cap according to another embodiment of the invention. In this embodiment the lock portion 2' is fixedly attached to and extends vertically downwards from the lower surface of the outer cover portion 8', but is slightly off-centre with respect thereto. Pillar elements defining internally threaded mounting holes 4a' are provided on opposite sides of and extend the length of the lock portion 2'. A portion of the lower surface of the outer cover portion 8' adjacent to the lock portion 2' defines a short, downwardly extending wall constituting a circular accommodation portion 8c which is in communication with an air passage 8b and clearance 8a such as described above and which may accommodate a rubber element 23 which has a generally H-shaped cross-section, whereby the central portion thereof is held clear of the lower surface of the outer cover portion 8' and is also held above the level of the lower edge of the accommodation portion 8c. In the central portion of the rubber element 23 there is defined an air passage 23a.

The rubber element 23 is kept in the accommodation portion 8c by a plate 24 which is in screwed attachment or similarly fixed to the wall portion defining the accommodation portion 8c and the central portion of which defines or has mounted therein a pipe portion 19' having a lower end portion which extends to below the lower surface of the plate 24, has provided therearound a sheet 22' of rubber or similar material, and defines a flanged lower-end opening. The attitude-sensor valve unit 11', comprising a main housing and weight ball 15 and mantle element 16 contained therein, has the same general construction as described above and is fixed to the lower surface of the plate 24, the valve unit 11' thus being aligned generally parallel to the lock portion 2' and the lower end thereof being generally level with the lower end of the lock portion 2'. This disposition of elements of the fuel tank cap has the advantage that overall construction is more compact. In the pipe element 19' there is provided a small ball 25 which is made of steel or similar material has a diameter smaller than that of the pipe element 19'. The small ball 25 normally acts to seat the mantle element 16 on the steel ball 15 and so ensure that air may pass freely through the valve unit 11', but being much smaller and lighter than the weight ball 15 is moved upwards together with the mantle element 16 when the fuel tank cap is inclined from a vertical attitude and the weight ball 15 moves from the lowermost portion of the unit 11', whereby the abovedescribed shut-off action is accomplished and leakage of fuel is prevented. The small ball 25 is prevented from moving upwards out of the pipe element 19' by the rubber element 23.

The upper end portions of the lock portion 2', mounting pillar elements and valve unit 11' are surrounded by a wall which is fixedly or integrally attached to and extends downwards from the lower surface of the outer cover portion 8' and defines a short stem portion 4', and these elements are enclosed by a casing 26 whose upper end fits around the short stem portion 4', there suitably being provided a sealing ring element between the stem 4' and casing 26, and which is held in place by threaded bolts which pass through holes formed in the lower wall portion thereof and are screwed into the mounting holes 4a'. In the lower portion of the casing 26 there are mounted two horizontally disposed lock bolts 6' which are normally held in outwardly extended, locking positions by suitable spring means, and which may be moved inwards by action of the lock portion 2'. The lower wall portion of the casing 26 also defines openings 26a via which air may pass into the fuel tank.

Thus, normally, when the weight ball 15 is in a lowermost position in the valve unit 11', air passes through the clearance 8a, passage 8b, accommodation portion 8c and the opening 23a defined in the rubber element 23, through the pipe element 19', passing around the small ball 25, into the upper portion of the valve unit 11' above the mantle element 16, through the side-wall openings in the mantle element 16 into the lower portion of the casing 23, and through the openings 21 in the casing 23 lower wall into the fuel tank. When the fuel tank is titled more than a certain amount from a vertical attitude the valve unit is closed in the manner described above.

By suitable selection of the curvature of the concave portion 14 of the lower wall portion of the attitude-sensor valve unit, and of the size of the weight ball 15 relative to the other portions of the valve unit it is of course possible to effect closure of the air passage at different degrees of tilt of the fuel tank from a vertical attitude. Further, needless to say, the above described fuel tank cap may be modified in various ways without departure from the principles of the invention, for example by providing a mantle element 16 which has a flat upper surface and providing around the lower opening of the pipe element 19 a circular, downwardly extending seal element against which the upper surface of the mantle element 16 may press when the mantle element is moved upwards by the weight ball 15. The scope of the invention should therefore be determined from the attached claims.

What is claimed is:

1. In a motor vehicle fuel tank cap comprising a lock means portion permitting said fuel tank cap to be held in locked attachment to the inlet of the fuel tank of a motor vehicle and defining at least one passage through which external air may pass in order to enter said fuel tank, a motor vehicle fuel tank cap comprising an attitude-sensor valve unit which is provided on said air passage, which is open when said motor vehicle is in a normal, generally upright attitude, and which closes said air passage when said motor vehicle is inclined more than a certain amount from an upright attitude, said attitude-sensor valve unit comprising:
   a main housing having an upper portion including means defining an upper opening constituting a portion of said air passage, a lower wall portion defining a central, downwardly curved concave portion, and said main housing having at least one lower opening constituting a portion of said air passage and leading to said fuel tank;
   a weight ball element which is normally seated in a lowermost portion in said lower wall central portion and which may freely roll from said lowermost portion when said motor vehicle and fuel tank cap are inclined away from said normal, generally upright position;
   a mantle element fitted loosely in the lower portion of the valve unit and positioned over and around said weight ball element, the upper surface portion of said mantle element normally being below the level of said upper opening and said mantle element being movable upwards and towards said upper opening by said weight ball element when said weight ball element moves from said lowermost position; and
   sealing means defined by at least said upper opening at the lower surface of the upper portion of said main housing and which cooperates with the upper surface portion of said mantle element to seal said upper opening when said motor vehicle is inclined more than a certain amount from said normal, generally upright attitude and said mantle element is moved upwards more than a certain amount by said weight ball element.

2. In a motor vehicle fuel tank cap comprising a lock means portion permitting said fuel tank cap to be held in locked attachment to the inlet of the fuel tank of a motor vehicle and defining at least one passage through which external air may pass in order to enter said fuel tank, a motor vehicle fuel tank cap comprising an attitude-sensor valve unit which is provided on said air passage, which is open when the motor vehicle is in a normal generally upright attitude, and which closes said air passage when said motor vehicle is inclined more than a certain amount from an upright attitude said attitude-sensor valve unit comprising:
   a main housing having an upper portion defining an upper opening constituting a portion of said air passage, a lower wall portion which defines a central, downwardly curved concave portion and at least one lower opening constituting a portion of said air passage;
   a weight ball element normally seated in a lowermost position in said lower wall central portion and which may freely roll from said lowermost position when said motor vehicle and fuel tank cap are inclined away from said normal, generally upright position;
   a mantle element loosely fitted in the lower portion of said valve unit and positioned over and around said weight ball element with an upper surface portion normally below the level of said upper opening and said mantle element being moved upwards and towards said upper opening by said weight ball element when said weight ball element moves from said lowermost position, and which defines at least one side-wall opening constituting a portion of said air passage; and
   sealing means provided at the lower surface of said upper portion of said main housing and around said upper opening, and which cooperates with the upper surface portion of said mantle element to seal said upper opening when said motor vehicle is inclined more than a certain amount from said normal, generally upright attitude and said mantle element is moved upwards more than a certain amount by said weight ball element.

3. Motor vehicle fuel tank cap as claimed in claim 1, wherein said lock means portion is enclosed by a case means, an upper portion of said air passage being defined in side wall portions of said lock means portion and said case means, and wherein said attitude-sensor valve unit is provided in attachment to the lower surface portion of said case means.

4. Motor vehicle fuel tank cap as claimed in claim 1, wherein said attitude-sensor valve unit is provided at the side of and in a generally parallel relationship to said lock means portion, and wherein said lock means portion and said attitude-sensor valve unit are enclosed by a casing means having defined in a lower portion thereof at least one opening constituting a portion of said air passage.

* * * * *